(12) United States Patent
Tang et al.

(10) Patent No.: US 6,988,092 B1
(45) Date of Patent: Jan. 17, 2006

(54) METHOD FOR EVALUATION OF ENERGY UTILITIES

(75) Inventors: Le Tang, Cary, NC (US); Xiaoming Feng, Apex, NC (US); David Lubkeman, Raleigh, NC (US); Anil Pahwa, Manhattan, KS (US); Jiuping Pan, Raleigh, NC (US); Lan Trinh, Cary, NC (US); Zhenyuan Wang, Apex, NC (US)

(73) Assignee: ABB Research Ltd., Zurich (CH)

( * ) Notice: Subject to any disclaimer, the term of this patent is extended or adjusted under 35 U.S.C. 154(b) by 518 days.

(21) Appl. No.: 10/037,397

(22) Filed: Dec. 21, 2001

Related U.S. Application Data
(60) Provisional application No. 60/258,478, filed on Dec. 28, 2000.

(51) Int. Cl.
  *G06F 17/30* (2006.01)

(52) U.S. Cl. ............................... 707/1; 705/10; 705/11
(58) Field of Classification Search ............... 707/1–10; 705/1–11
See application file for complete search history.

(56) References Cited

U.S. PATENT DOCUMENTS

| | | | | |
|---|---|---|---|---|
| 5,819,066 A | * | 10/1998 | Bromberg et al. | 707/102 |
| 5,991,741 A | * | 11/1999 | Speakman et al. | 705/30 |
| 6,088,676 A | * | 7/2000 | White, Jr. | 705/1 |
| 2003/0158749 A1 | * | 8/2003 | Olchanski et al. | |

OTHER PUBLICATIONS

Charnes et al, Comparison of DEA and Existing Ratio and Regression Systems for Effecting Efficiency Evaluations of Regulate Electric Cooperatives in Texas, Research in Government And Nonprofit Accounting, vol. 5, pp. 187–210, Copyright 1989.*

Charnes, A. et al., "Measuring the Efficiency of Decision Making Units," *European Journal of Operations Research*, 1978, 2, 429–444.

Farell, M. J., "The Measurement of Productive Efficiency," *Journal of the Royal Statistical Society*, 1957, Series A, 120(3), 253–281.

Dyson, R. G., "Data Envelopment Analysis," Ali Emrouznejad's DEA HomePage, (www.warwick.ac.uk/~bsrlu/dea/deat/deat.htm), 1 page, 1995.

Trick, M., "Data Envelopment Analysis for Consultants," (www.mat.gsia.cmu.edu/mstc/dea/dea.html), 2 pages, 1996.

Beasley, J. E., "Data Envelopment Analysis," *OR–Notes*, (www.mscmga.ms.ic.ac.uk/jeb/or/dea.html), 14 pages.

Coelli, T., "A Guide to DEAP Version 2.1: A Data Envelopment Analysis (Computer) Program," University of New England, Armindale, NSW, Australia (www.une.edu.au/econometrics/cepanews.htm), 2 pages.

Färe, R. et al., "The Relative Efficiency of Illinois Electric Utilities," *Resources and Energy*, 1983, 5, 349–367.

(Continued)

*Primary Examiner*—Greta Robinson
*Assistant Examiner*—Debbie M. Le
(74) *Attorney, Agent, or Firm*—Woodcock Washburn LLP (57) ABSTRACT

A computer implemented method uses a database of detailed, comprehensive utility operating and financial information. The method comprises: (1) feature based matching or similarity based benchmark and focus group selection; (2) a performance assessment procedure comprising multi-perspective analysis; and (3) multi-attribute business profiling and performance improvement potential analysis. As part of the performance assessment step, data corresponding to different utilities in a selected benchmark group are compared with each other to find their strengths and weaknesses. Interpretation of these gaps provides the cause of such gaps. Composite ranking analysis is used so that a composite score of at least one utility business is obtained.

18 Claims, 8 Drawing Sheets

OTHER PUBLICATIONS

Charnes, A. et al., "Comparisons of DEA and Existing Ratio and Regression Systems for Effecting Efficiency Evaluations of Regulated Electric Cooperatives in Texas," *Research in Government and Nonprofit Accounting*, 1989, 5, 187–210.

Miliotis, P. A., "Data Envelopment Analysis Applied to Electricity Distribution Districts," *Journal of Operational Research Society*, 1992, 43(5), 549–555.

Bagdadioglu, N. et al., "Efficiency and Ownership in Electricity Distribution: A non–parametric model of the Turkish experience," *Energy Economics*, 1996, 18, 1–23.

Førsund, F. R. et al., "Productivity development of Norwegian electricity distribution utilities," *Resource anbd Energy Economics*, 1998, 20, 207–224.

Hjalmarsson, L. et al., "Productivity in Swedish Electricity Retail Distribution," *Scandinavian Journal of Economics*, 1992, 94 (*Supplement*), S193–S205.

Kittelsen, S. A. C., "Using DEA to Regulate Norwegian Electricity Distribution Utilities," *Presentation at the Sixth European Workshop on Efficiency and Productivity Analysis*, Copenhagen, Denmark, Oct. 29–31, 1999, 10 pages.

Agrell, P. J. et al., "Efficiency and Incentives in Regulated Industries: The Case of Electricity Distribution in Scandinavia," *Presentation at the Sixth European Workshop on Efficiency and Productivity Analysis*, Copenhagen, Denmark, Oct. 29–31, 1999, 1–31.

"Choice of model and availability of data for the efficiency analysis of Dutch network and supply businesses in the electricity sector," *Netherlands Electricity Regulatory Service*, Feb. 2000, 46 pages.

"Efficiency and benchmarking study of the NSW distribution businesses," *Independent Pricing and Regulatory Tribunal of New South Wales*, Feb. 1999, 105 pages.

Review of Public Electricity Suppliers 1998–2000, Distribution Price Control Review: Consultation Paper, *Office of Electricity Regulation(OFFER)*, Birmingham, UK, May 1999.

UMS group Inc. HomePage (www.umsgroup.com).

DATAMONITOR Home Page (www.datamonitor.com).

POWERdat, Resource Data International, Boulder, CO, 1997.

Utility DATAPACK, Utility Data Institute, Fairfield, CT, 1997.

Cooper, W. W. et al., *Data Envelopment Analysis*, Kluwer Academic Publishers, Boston, 2000.

Norman, M. et al., *Data Envelopment Analysis: The Assessment of Performance*, John Wiley & Sons, Chichester, 1991.

* cited by examiner

Feature Matching Based BM Selection

List of Features
- System peak load (MW)
- Total retail sales (MWh)
- Total retail customers
- Network losses (%)
- CapExp (k$) per customer
- O&M cost (k$) per line mile
- .....

Matching Criteria
- Much high than median
- Higher than median
- Around median
- Lower than median
- Much lower than median
- Around upper 25 percentile
- .....

Fig 4

Similarity Based BM Selection

| Based on | Neighborhood |
|---|---|
| System peak load (MW) | within 20% |
| Total retail sales (MWh) | within 50% |
| Total retail customers | within 20% |
| Network losses (%) | within 15% |
| CapExp (k$) per customer | within 20% |
| O&M cost (k$) per line mile | within 20% |
| ...... | ...... |

METHOD FOR EVALUATION OF ENERGY UTILITIES

RELATED APPLICATIONS

This application claims benefit of U.S. Provisional Application Ser. No. 60/258,478, filed Dec. 28, 2000, entitled "Performance Based Assessment Process for Energy Utilities".

FIELD OF THE INVENTION

This invention relates to the field of computer based methods for improving efficiency and cost-effectiveness in the utility industry. In particular, the present invention is directed to a computer based method for facilitating performance based business evaluation of energy utilities.

BACKGROUND OF THE INVENTION

The restructuring of energy utilities worldwide is changing the way energy utilities conduct business. In particular utilities are becoming more concerned about reducing the cost of operation and maintenance and improving the efficiency of resource utilization and customer service satisfaction in order to stay competitive in the changing business environment.

As a result, increasingly, energy utility companies are recognizing the value of benchmarking and performance assessment processes as an essential means of evaluating their operational and financial performance against current and potential competitors. The process of benchmarking and performance assessment also provides useful information to non-utility parties. Such parties may be investors or vendors interested in identifying new business opportunities and providing complete systems solutions to utilities with poor business performance.

Naturally, such benchmarking techniques require large amounts of raw data. In fact, such large amounts of energy utility data are available in the public domain for most developed countries around the world, from which a number of commercial database products have been developed.

Further, utility evaluation methods also do exist. However, the usefulness of such procedures has been limited either due to the need for extensive user involvement and data requirement or due to excessive simplicity with only a few predefined inputs used for analysis.

Thus, the primary objective of this invention is to introduce a performance based business assessment method that is computer based and uses an extensive, comprehensive database of publicly available data, as well as a standardized performance assessment procedure to develop insight into the relative strengths and weaknesses of a utility.

In addition existing evaluation tools have been unable to provide a standardized methodology for composite overall ranking for a utility under evaluation. That is, where comparison between the utility being evaluated (i.e., the "target") and the benchmark group is based on individual performance ratios or performance indicators, there is typically no single utility that performs best in every business area. Thus, it would be desirable to have a methodology for relative weighting of performance indicators so that composite ranking for utilities under evaluation might be obtained.

SUMMARY OF THE INVENTION

The present invention represents an improvement on existing utility performance assessment methods. In particular, the invention provides a computer-implemented process for performance based business assessment of energy utilities, consisting of (1) data collection, (2) benchmark and focus group selection, (3) performance assessment and (4) utility business profiling. The computer implemented method uses a database of detailed, comprehensive utility performance indicators and inputs, thus providing more meaningful performance assessment than existing procedures. In addition, the inventive method features: (1) a formalized yet highly flexible and easy to use process for feature matching or similarity based benchmark and focus group selection; (2) a structured, easy to use procedure for performance assessment comprising multi-perspective analysis, whether via parametric or non-parametric performance measures; and (3) multi-attribute business profiling and performance improvement potential analysis. As part of the performance assessment step, selected target utilities are compared with appropriately selected peer utilities or benchmark group to find their performance strengths and weaknesses. Interpretation of resulting gaps provides the cause of such gaps.

Furthermore, the method of the present invention preferably uses composite ranking analysis, cross checking analysis and multi-attribute utility business profiling in the profiling step. The composite ranking analysis provides a composite score of the evaluated utility taking into consideration the contributions from all evaluated performance ratios or performance indicators while the multi-attribute utility business profiling provides graphical performance overview of the evaluated utility as compared to the benchmark statistics. The cross checking analysis is used to analyze the consistence of the information obtained from alternate assessment methods.

Figure 1:
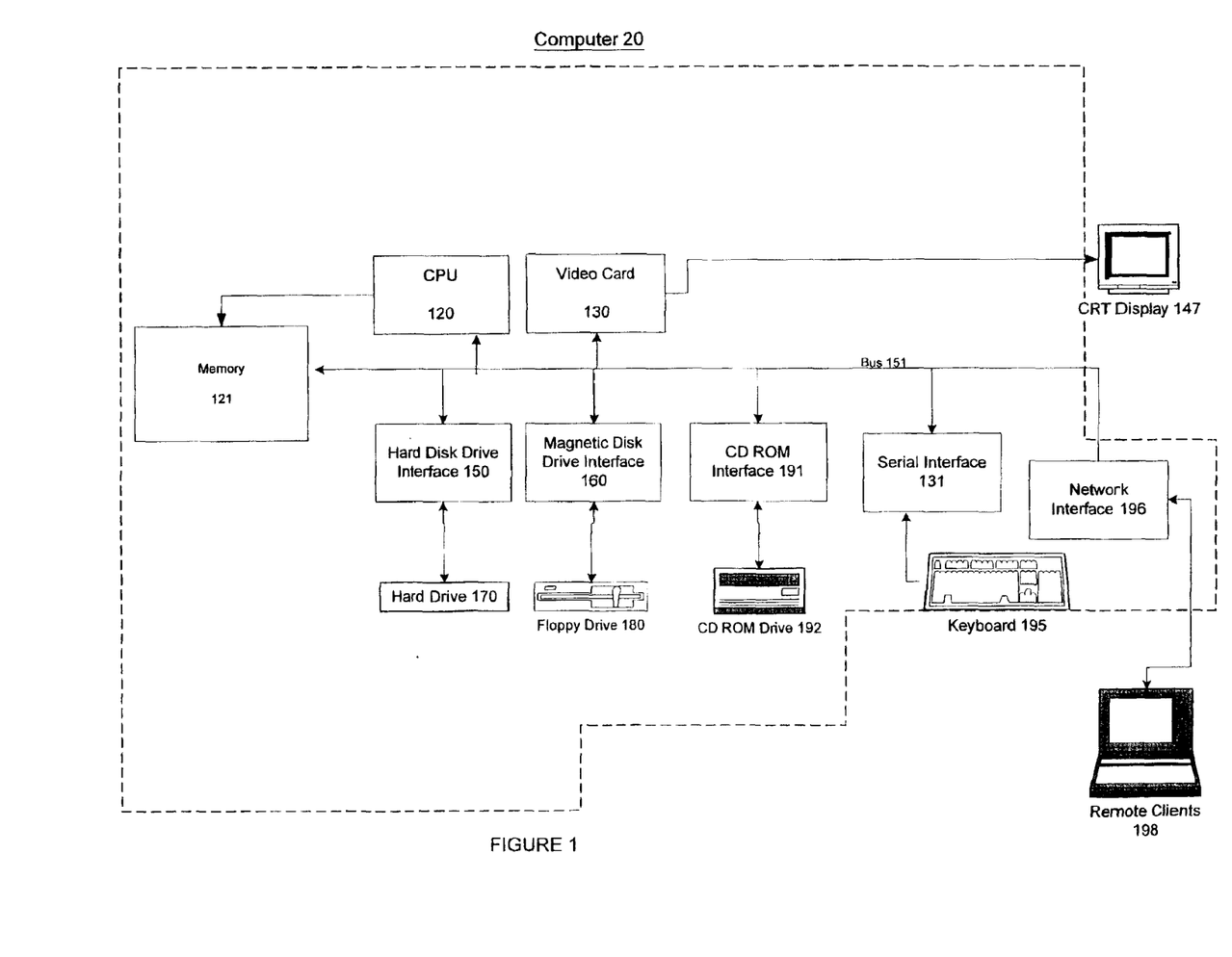
FIG. 1 shows an exemplary computing environment in which aspects of the present invention may be implemented.

DETAILED DESCRIPTION OF PREFERRED EMBODIMENTS a. Exemplary Computing Environment FIG. 1 shows a high level overview of a computing environment in which a utility assessment method in accordance with the present invention may be implemented. In particular, a computer 20 includes conventional computer hardware components including a Central Processing Unit ("CPU") 120, a system memory 121, and a system bus 151 that couples the system memory 121 to CPU 120 and other computer system 20 components. The system memory 121 typically includes read only memory (ROM), random access memory (RAM) or other conventional known memory types. During operation, instructions comprising application program modules, which may include an operating system and a utility software application for performing a performance assessment method in accordance with the present invention are typically stored in and retrieved from memory 121 by CPU 120, which executes said instructions. A user may enter commands and other input into the computer 20 via input devices such as a keyboard 195, mouse, scanner or other input device. A display device 147 is also coupled to the system bus 151 via a video graphics adaptor card 130. The display device 147, which may be a CRT monitor, LCD terminal or other display, includes a screen for the display of information which is visible to the user.

Finally, the computer system 20 includes storage device components, including hard disk drive 170, floppy disk drive 180 and CD ROM drive 192. Any of the storage devices (the hard disk drive 170 for example) may store a database of utility performance indicators used by a utility assessment in accordance with the present invention.

b. Overview

Figure 2:
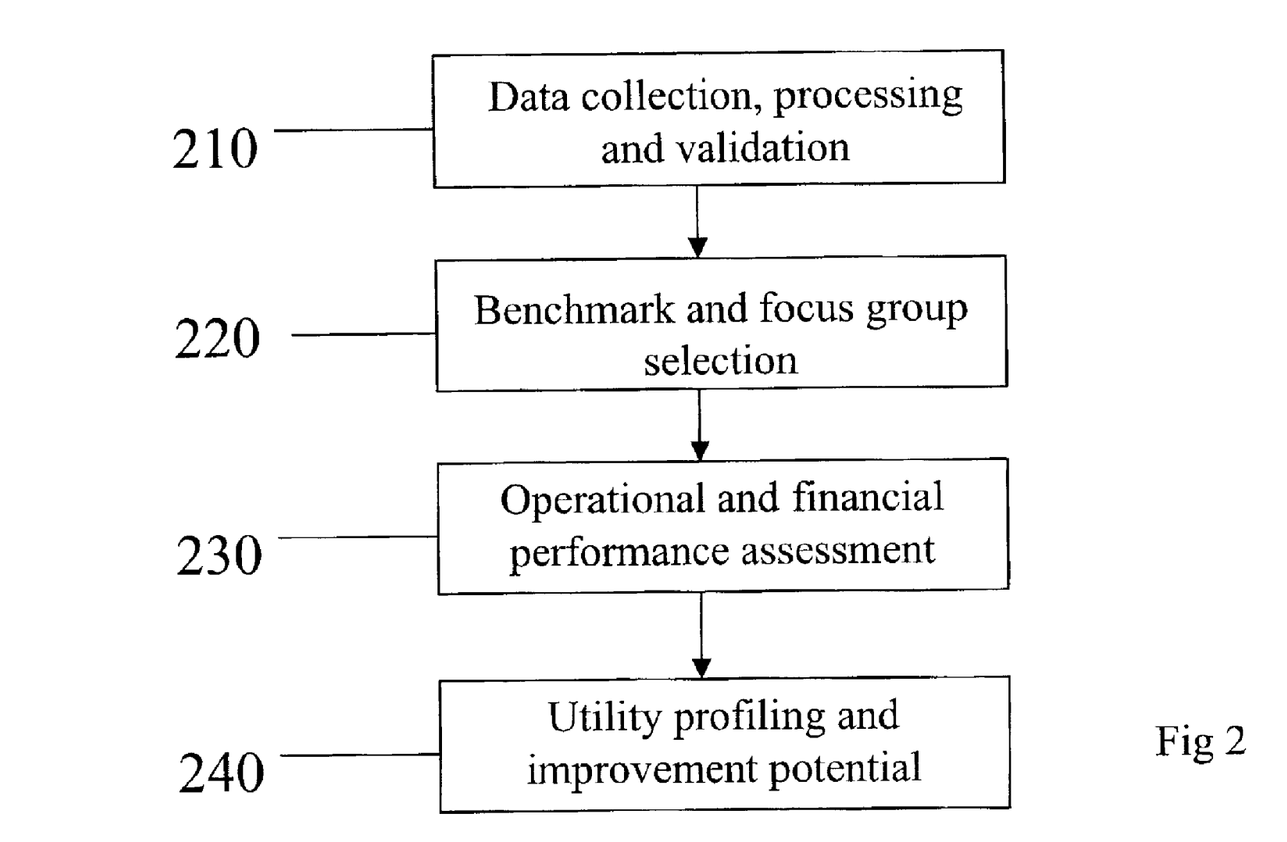
FIG. 2 is a high level flow chart showing a process for performance based business assessment in accordance with an embodiment of the present invention.

Having described a computing environment in which a utility assessment method in accordance with the present invention may be implemented, an overview of such a method is now described with reference to FIG. 2. As depicted, the process comprises of four steps: (1) data gathering (Step 210); (2) benchmark and focus group selection (Step 220); (3) performance assessment (Step 230); and (4) business profiling (Step 240). The main objective of such performance based business assessment is to quantify cost and service level performance strength and weakness for a focus (i.e., target) utility as compared to appropriately defined peer utilities or benchmark groups. Each of the steps in the performance assessment method is described in greater detail below.

i. Data Gathering

Figure 3:
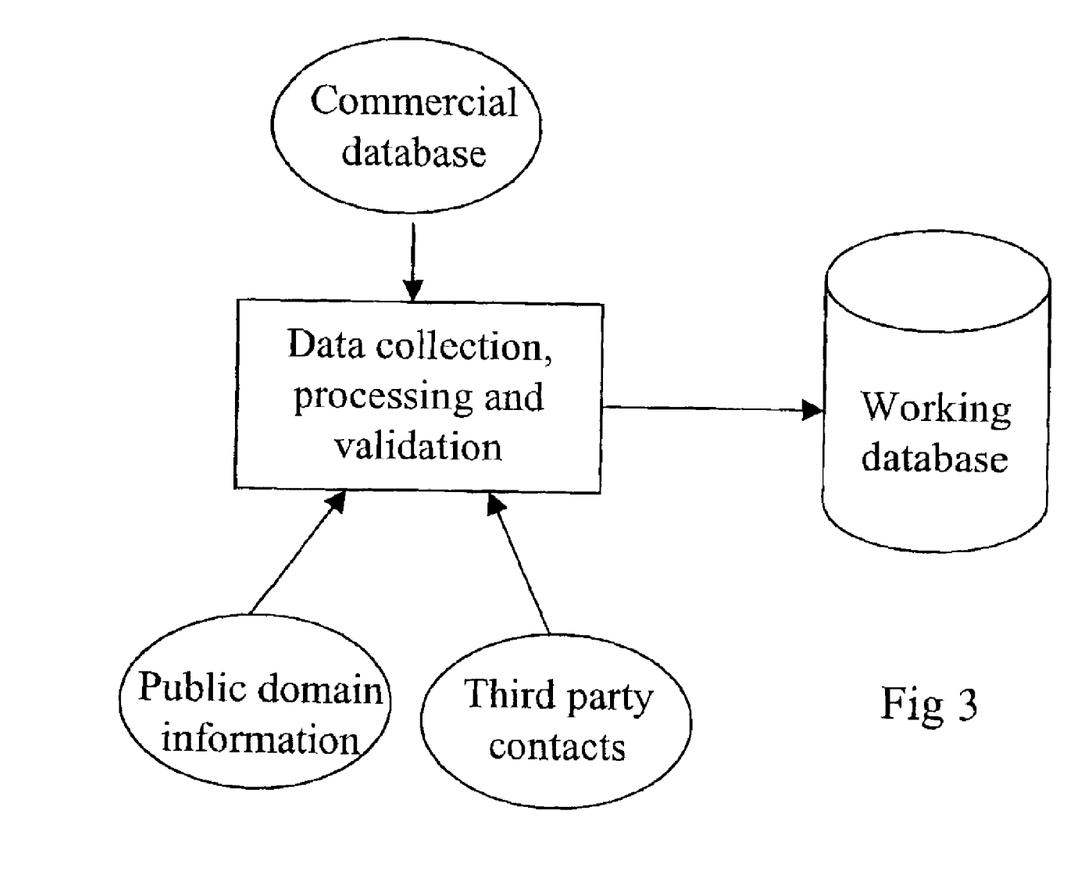
FIG. 3 is a high level flow chart that shows in greater detail the step of gathering data shown in FIG. 2.

FIG. 3 is a functional overview of the process for developing a working database in support of a performance based business assessment process. As depicted, the major components of the process are: (1) data collection; (2) data processing; and (3) data validation. As mentioned earlier, a large amount of utility data is available in the public domain for most developed countries around the world. For instance, in the United States, utility operational and financial information can be readily obtained either from commercial utility database products, such as POWEDAT and North American Energy Business Directory, or directly from utility annual reports available in the Federal and State government web-sites. Other data sources may include individual utility web-sites and third party contracts. Data should preferably be gathered from any and all such sources so that the database is comprehensive.

As for data verification, it should be pointed out that the data validation process is of essential importance in the development of a working database since data obtained from different sources may be inconsistent and the raw data set may have inaccurate information due to original utility input errors.

In the presently described embodiment, the utility assessment method uses a working database that includes detailed US Investor Owned Utilities ("IOU's") business information gathered from the above mentioned sources. Thus, the following are possible database tables relating to such IOUs:

1. Business Overview Table: The Business Overview table provides data for every US IOU company including key operational factors such as generation capacity, demand, sales, O&M costs, and average rates. This table also provides some general holding company information.

2. Electric Sales Table: this table provides detailed information on retail electricity sales by customer class. Data included are the number of customers, MWh sales, revenue, rate and revenue per customer.

3. Energy Balance Table: this table contains all of the sources and uses of energy by a utility including generation, purchases, exchanges, sales, company use and losses.

4. Embedded Costs Table: The Embedded Costs table summarizes the overall costs for a utility, including power supply, transmission and distribution, as well as administrative and general costs.

5. O&M Expense Table: this able provides detailed costs by FERC account for operation and maintenance of electric plant. These costs include any annual expenses incurred during the standard operation and maintenance of steam, nuclear, hydraulic or other production plant, other power supply (including system dispatching expenses), distribution, transmission, customer sales & information, administrative and general plant expenses.

6. Demand Forecasts Table: The Demand Forecasts information table includes 10-year load & resource forecasts and planning area demand forecasts.

7. Financial Ratios Table: The Financial Ratios table includes a comprehensive list of financial ratios that summarize the position and performance of the utility.

8. Salary and Wage Table: The Salaries and Wages table provides direct salaries and wages and those salaries and wages initially charged to clearing accounts and later allocated to the appropriate category. Costs are divided into operation and maintenance costs, utility costs, and costs initially allocated to clearing accounts.

8. Network Table: the Network Table provides utility transmission and distribution network information, including overhead pole miles, underground circuit miles, distribution line transformer number and capacity, utility service territory and estimated population.

Besides these raw data tables, many intermediate working tables may be created as a byproduct of the utility assessment process. Such intermediate tables maybe for different purposes, such as the allocation of total energy losses (MWh) into transmission and distribution categories, and the calculation of average capital expenditure, average demand growth and annual retail customer growth.

ii. Benchmark and Focus Group Selection

Figure 4:
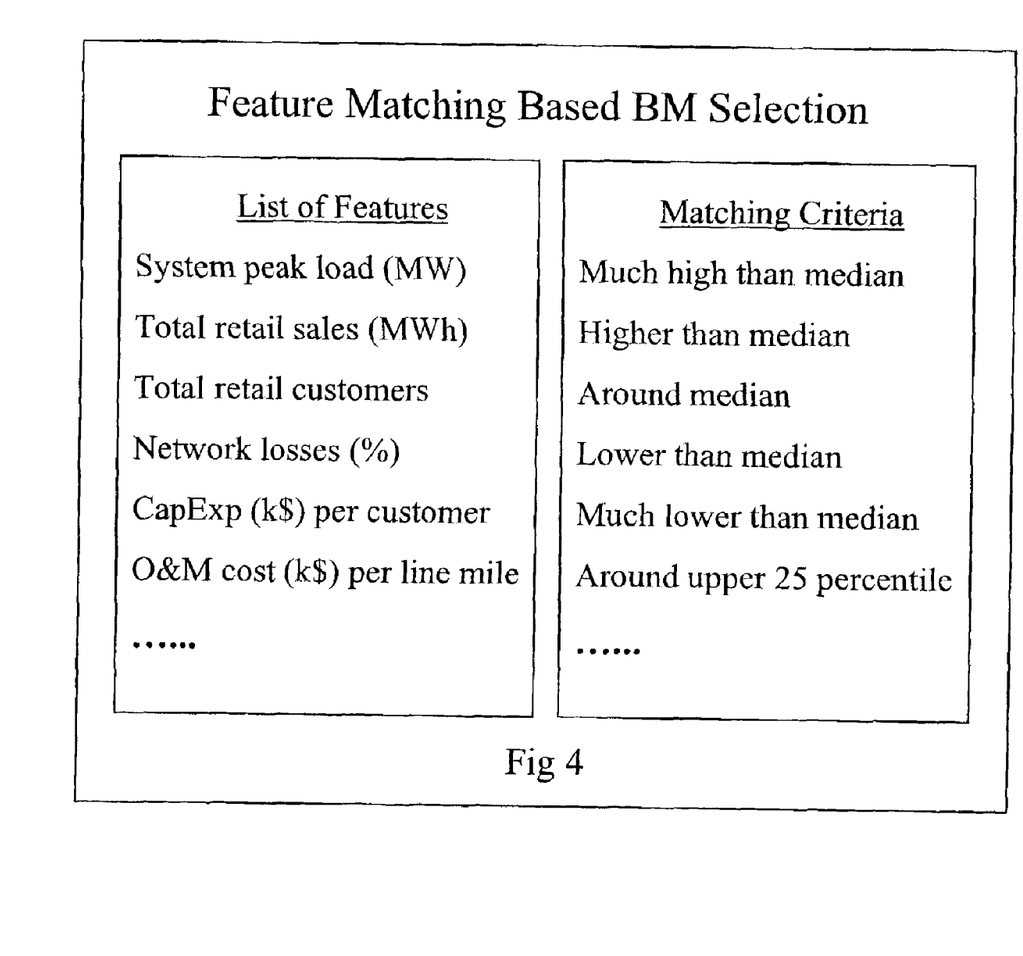
FIG. 4 shows a list of utility performance indicators that may be used to perform the benchmark and focus group selection step shown in FIG. 2 via feature based benchmarking.

The purpose of BenchMark (BM) group selections is to define a group of utilities that are comparable to each other or the focus/target utility with regard to selected criteria. The method of the present invention provides a formalized, yet highly flexible process for benchmark group selection, including feature matching based BM selection, similarity based BM selection and manual BM selection from a group of peer or competitive utilities. FIG. 4 illustrates an exemplary application of feature matching based BM selection and FIG. 5 illustrates an exemplary application of similarity based BM selection as for electric distribution companies.

As shown in FIG. 4, using the feature based BM selection method, a group of utilities from the working database are selected that are comparable to each other with regard to selected criteria. The preferred method is to match a group of utilities such that a set of selected system characteristics and performance indicators are within a certain range of the median or upper/low quartile of the working database data. In the example depicted in FIG. 4, the performance indicators and utility characteristics are: System Peak Load (MW); Total Retail Sales (MWh); Total Retail Customers; Network Losses (%); CapExp (k$) Per Customer; and O&M Cost (k$) Per Line mile. In the example depicted, performance indicator and utility characteristic data for one year are used. But multi-year feature matching or pattern recognition may also be applied.

This BM selection method is specifically designed for screening purposes with various utility groups. Such benchmark selection may be accomplished via selection from a list of such performance indicators and utility characteristics and from a list of corresponding tolerances using appropriate interface screens. Utilities matching the selected criteria can then be obtained from the working database using database search and retrieval techniques known in the art.

Figure 5:
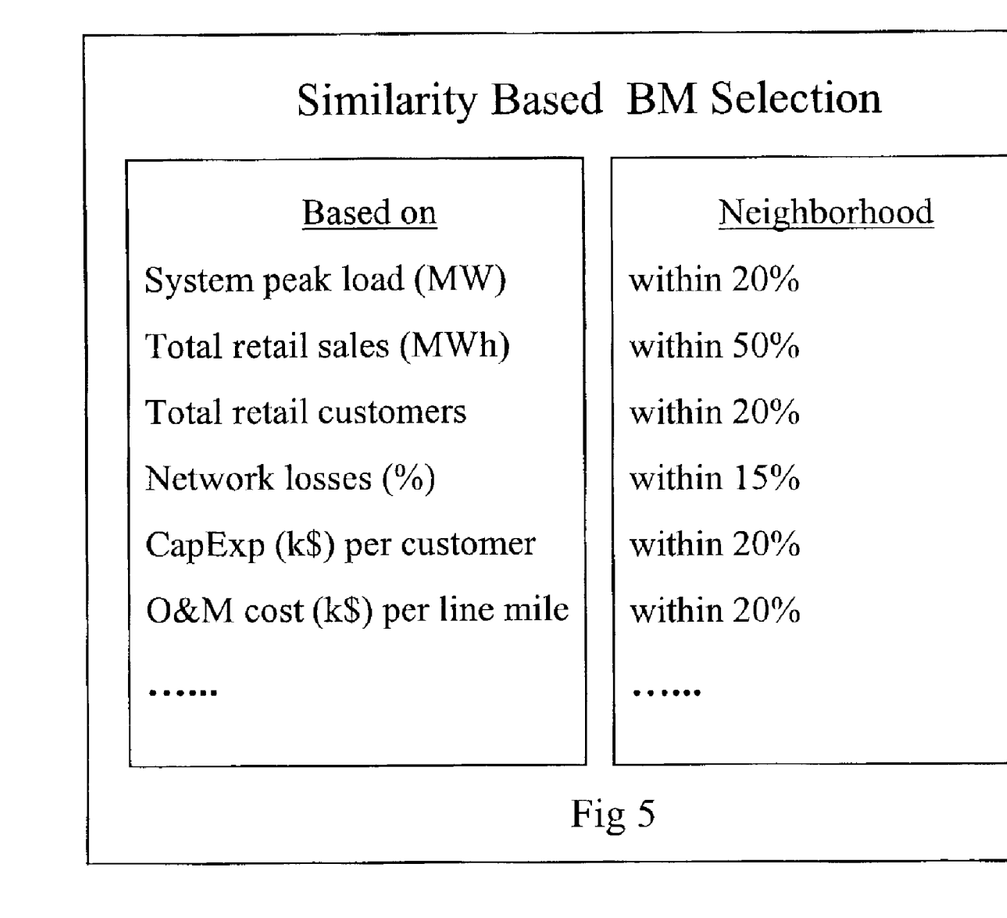
FIG. 5 shows a list of utility performance indicators that may be used to perform the benchmark and focus group selection step shown in FIG. 2 via similarity based benchmarking.

As shown in FIG. 5, using the similarity analysis based BM selection method, a group of utilities from the working database are selected that are sensibly comparable to a particular benchmark (i.e., the target) utility with regard to defined criteria. Again, in the example depicted, the criteria are: System Peak Load (MW); Total Retail Sales (MWh); Total Retail Customers; Network Losses (%); CapExp (k$) Per Customer; and O&M Cost (k$) Per Line mile. The preferred procedure is to identify a group of utilities such that the set of selected system characteristics and performance indicators are within a certain range of the target utility. This BM selection method is particularly useful for investigating the relative strength and weakness of a focus or target utility with reference to a comparable group of utilities. Again, such benchmark selection may be accomplished via selection from a list of performance indicators and utility characteristics, a list of corresponding tolerances and from a list of potential target utilities using appropriate interface screens. Utilities matching the selected criteria can then be obtained from the working database using database search and retrieval techniques known in the art.

In the presently described embodiment, the benchmarking step may also be performed manually. For example, using a software tool providing an appropriate interface screen, a user may select a benchmark group and focus (target) utility from among a list of utilities.

For example, the benchmark group can be chosen as all large US IOUs or the IOU companies within the same NERC (North American Electricity Reliability Council) region of the target utility in the focus group. The benchmark group can also be customized as, for example, the top 30 utilities in terms of system demand or total retail sales or total retail customers, assuming the primary focus is on large electric companies.

iii. Performance Assessment

Once the benchmark group is selected, the target/focus utility can be assessed in relative terms. This invention provides a structured procedure for performance assessment comprising multi-perspective analysis, including both parametric and non-parametric performance issues. Three types of methods are integrated into the process of performance based business assessment, including ratio analysis, regression analysis, and data envelopment analysis (DEA), to conduct metric-by-metric comparisons and evaluate overall utility efficiency. Any combination of these can be used for performance assessment. The following gives a brief description for each performance assessment method.

Ratio analysis is designed to compare the selected performance ratios for a target utility with the benchmark group statistics. Again, ratios can be selected from appropriate interface screens. For example, the following are potential predefined ratios for electric distribution performance assessment that may be stored in a working database for selection during implementation of the presently described method: (1) O&M Cost (defined as Distribution Operation Cost Per Line Mile); (2) O&M Cost (defined as Distribution Maintenance Cost Per Line Mile); (3) O&M Cost (defined as Distribution O&M Cost Per Line Mile); (4) O&M Cost (defined as Distribution Operation Cost Per Customer); (5) O&M Cost defined as Distribution Maintenance Cost Per Customer; (6) O&M Cost (defined as Distribution O&M Cost Per Customer); (7) Capital Expenditure (defined as Distribution Capital Expenditure Per MWh Sale); (8) Capital Expenditure (defined as Distribution Capital Expenditure Per Customer); (9) Embedded Cost (defined as Capital Cost per MWh); (10) Embedded Cost (defined as Capital Cost Per kW); (11) Embedded Cost (defined as Depreciation Cost Per MWh); (12) Embedded Cost (defined as Depreciation Cost Per kW); (13) Embedded Cost (defined as Total Fixed Cost Per MWh); (14) Embedded Cost (defined as Total Fixed Cost Per kW); (15) Energy Losses (defined as Total Energy Losses (%)); (16) Energy Losses (defined as Estimated Distribution Losses (%)); (17) Staffing Efficiency (defined as Full Time Employee Per 1000 Customers); (18) Staffing Efficiency (defined as Full Time Employee Per 100 Distribution Line Miles); (19) Asset Utilization (defined as Peak Load Per Distribution Transformer MVA); (20) Asset Utilization (defined as Customer Per Distribution Line Transformer); (21) Aging Indicator (defined as Ratio of Net Asset to Gross Asset); (22) Aging Indicator (defined as Ratio of Capital Expenditure to Depreciation Expense), (23) Return on Common Equity %; (24) Operation Income % of Net P; (25) Return on Invested Capital %; (26) Preferred Dividend Payout Ratio; (27) Common Dividend Payout Ratio; (28) AFUDC % Earn Avail Comm; (29) Embedded Cost of Long Term Dividend %; (30) Debt to Equity Ratio; and (31) Current Ratio. To facilitate the performance assessment process, the list of performance ratios may be organized into different categories. One example would be to separate the ratios into cost/resource level performance ratios and service/productivity level performance ratios. Another example would be to divide the ratios into different utility business areas, such as O&M expenses, capital expenditure, energy losses, staffing productivity, asset utilization, facility aging and financial ratios.

Figure 6:
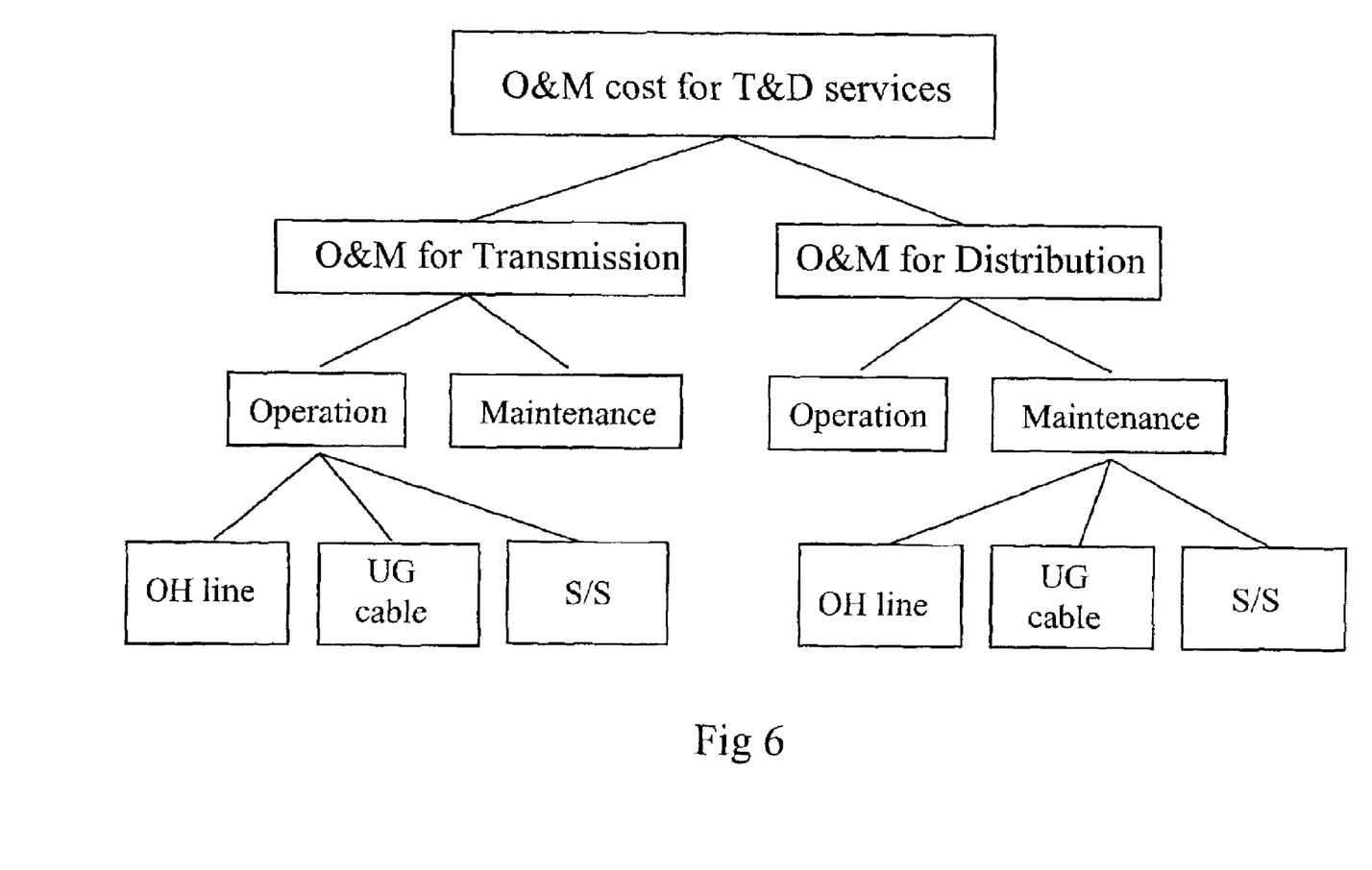
FIG. 6 shows a sample grouping of ratios that may be used to facilitate the performance assessment step shown in FIG. 2 via ratio analysis.

Similarly, to gain insight into utility business, ratio analysis may be performed using a hierarchy structure. FIG. 6 illustrates an example of hierarchy ratio analysis in which transmission and distribution O&M costs, averaged by total customers served or total energy supplied, can be compared between the focus/target utility and benchmark group at various T&D operation and maintenance service levels.

In the presently described embodiment, to have a more comprehensive assessment of utility business, ratio analysis may be conducted for a period of the most recent several years such that the trend of utility business performance can be captured and compared.

In the presently described method, the ratio analysis preferably uses an Access & Excel based tool of evaluation of electric utility business performance. The results of Ratio Analysis are provided in tabular form as well as graphical form, which compare the selected performance ratios of a focus group with the benchmark group statistics. The users can view the graphical results on the screen and/or export detailed input/output data using pre-designed Excel formats. In addition to the comparison with benchmark statistics, it is also meaningful to use percentile plots in ratio analysis to show the relative position of the target utility or focus group against different utilities in the benchmark group.

Regression analysis is another form of performance assessment. It has been recognized that utility business performance may be affected by various environmental factors. For example, the total O&M costs incurred to electric distribution utilities may have a strong correlation with the number of customers, total energy sales, total length of distribution network lines, etc. The application of regression analysis is to identify such inherent functional relationships between each performance indicator and the corresponding factors or drivers such that the expected level of each performance indicator can be estimated for the benchmark group and the focus/target utilities as well.

In regression analysis, the difference between the expected and actual performance levels would indicate the gap, either strength or weakness, of interested utilities relative to the average performance level of the benchmark group.

Figure 7:
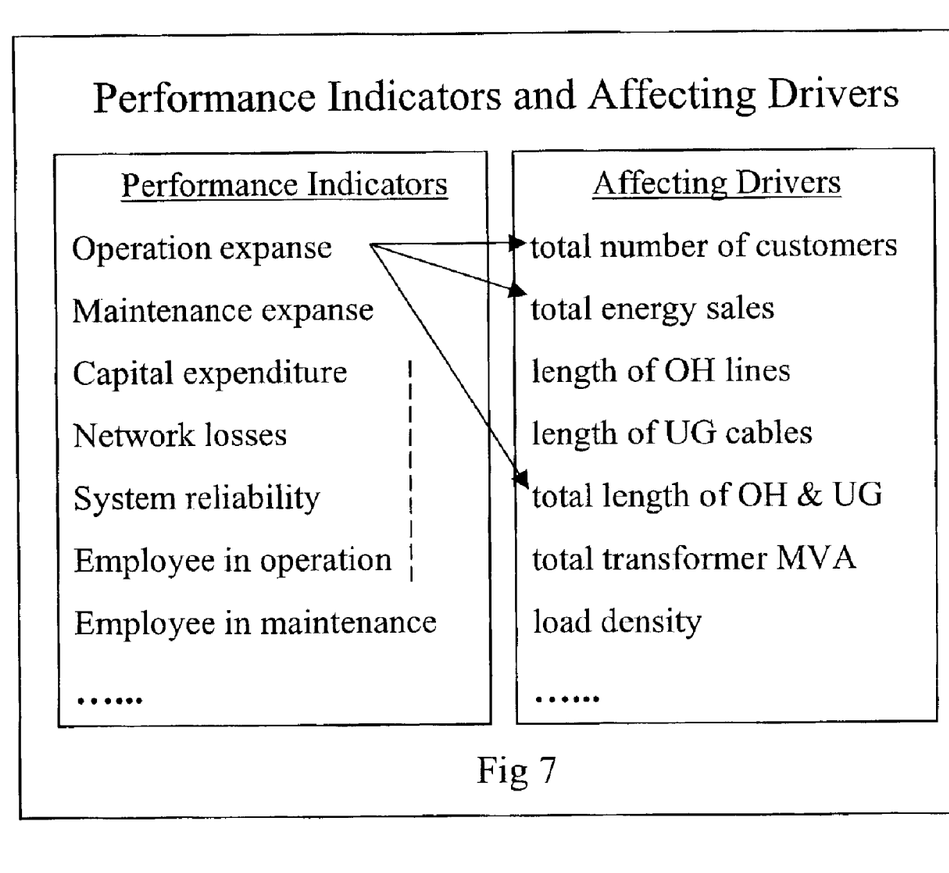
FIG. 7 shows a list of utility performance indicators that may be used to perform the performance assessment step shown in FIG. 2 via regression analysis.

FIG. 7 shows an exemplary application of regression analysis for electric distribution performance assessment via identification of the correlation between key Performance Indicators and Affecting Drivers. For example, assume there are seven performance indicators selected from an appropriate interface screen: (1) Operation Expense; (2) Maintenance Expense; (3) Capital Expenditure; (4) Network Losses; (5) System Reliability; (6) Employee in Operation; and (7) Employee in Maintenance. For each performance indicator (dependent variable) there is a list of default factors (independent variables) that are cost drivers (i.e., have a strong correlation with the performance indicator). These default factors are based on extensive analysis as the best terms to include. For example, in the presently described example, each Performance Indicator defined above is preferably determined to be correlated to a subset of the following Affecting Drivers respectively: (1) total number of customers; (2) total energy sales; (3) length of overhead lines; (4) length of underground cables; (5) total length of overhead lines & underground cables; (6) total transformer MVA; and (7) load density. Once the Performance Indicators and Affecting Drivers are defined, Automated Regression analysis can relate the dependent indicators to the independent drivers, determine how they relate on average and determine where the target utility should be on that basis.

Additionally, instead of using the default factors, the analyst may define a set of affecting drivers for each selected performance indicator. Automated Regression analysis can then be used to identify the correlation between performance indicators and affecting drivers. The resulting regression model by Automated Regression analysis may include all or only a subset of the candidate affecting drivers.

Data Envelopment Analysis is another form of performance ranking. Data Envelopment Analysis (DEA) is a generalized methodology for efficiency evaluation based on production frontier analysis.

A Decision Making Unit ("DMU") is the basic production unit in DEA. A DMU is an abstract concept. In DEA analysis, it is treated as a black box as DEA is only concerned with the observed input and output levels. A DMU is represented by a vector that lists the levels of DEA inputs and the corresponding levels of DMU outputs. The inputs are the resources consumed by the DMU for the purpose of producing the final products, which are outputs. The required resource may be physical and tangible (e.g., tons of raw materials, number of machines, etc.) or abstract and intangible (e.g., number of service hours by doctors or nurses). This vector represents the performance of a DMU as observed. In DEA, efficiency is defined as the total value of the outputs divided by the total value of the inputs. This definition is straightforward and easy to understand in the case of single input and single output DMU. But the definition of efficiency as the ratio of output value to input value can be extended to multiple inputs and multiple outputs.

In addition to allowing for calculation of the efficiencies of the DMU's, DEA also facilitates identification of excesses in inputs used, and any shortfalls in outputs. This provides useful information as to the weakness of each DMU and areas for further investigation and improvement for the target utility.

Figure 8:
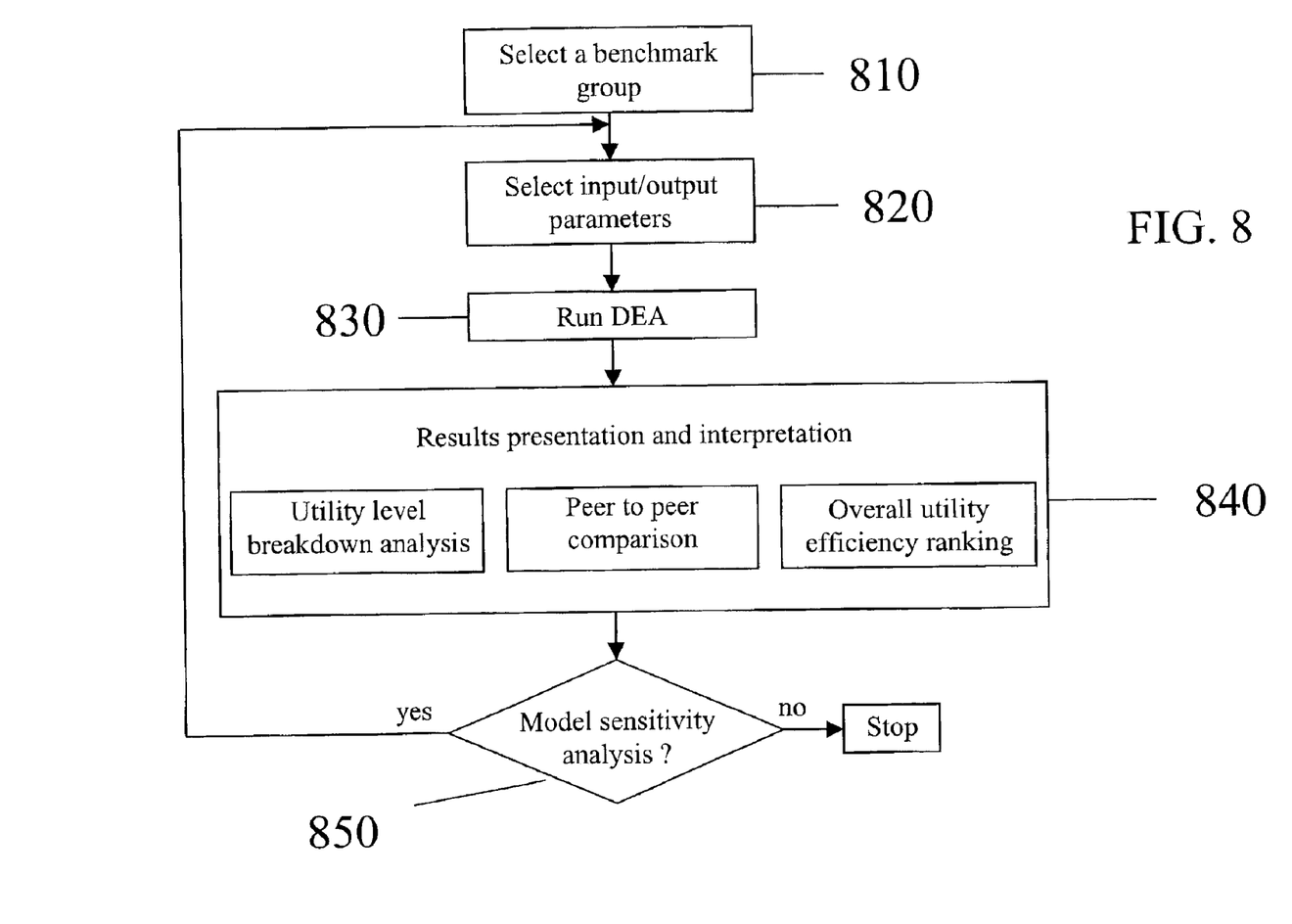
FIG. 8 shows in greater detail a method for performing the step of utility performance assessment shown in FIG. 2 via Data Envelopment Analysis.

Turning now to FIG. 8, it illustrates a general procedure for the application of DEA analysis that may be implemented using a computer based software tool. In Step 810, a benchmark group is selected using the methods described above. That is, the analyst decides which companies to include in the study by defining which companies to include in the benchmark group. If there are environmental factors (such as load density, customer composition) or economy of scale that makes some companies not comparable to others, separate benchmarking groups should be set up for separate evaluations.

In Step 820, the set of DEA input and output parameters are selected based on the study scope and focus. That is, the input to and the output from the abstract DMU entity is defined. Variable selection methods using interface screens as described above may be used for this task.

For example, there may be five input parameters to choose from, summarized as follows: (1) Distribution Systems Losses—Energy loss in MWh; (2) Distribution Operation and Maintenance Expenses—Expense in USD; (3) Distribution Capital Expenses—Expense in USD; (4) Distribution line transformer—Total MVA rating; and (5) Distribution lines—Circuit length. Similarly, there may be three output parameters to choose from as summarized as follows: (1) Distribution System peak load—Peak load in MW; (2) Retail sales—Energy sales in MWh; and (3) Retail customers—Number of customers.

If the analyst/user is interested in evaluating the relative efficiency of various utility companies in terms of the variable expense and total assets used to generate sales and serve customers, O&M Expense and Total Assets may be selected as inputs and Volume of Sales (MWh) and Number of End Users (i.e., the capacity or capability to serve a certain number of end users) may be selected as outputs.

Turning back to FIG. 8, in Step 830, the DEA analysis is run. This process is preferably automated using a computer and software tool environment as discussed in connection with FIG. 1.

The process is as follows: given a group of DMUs for efficiency analysis, for every DMU, an optimal DMU is constructed by a linear combination of all DMU's in the group. The optimal DMU is constructed through linear programming in such a way so that the input levels are minimized while all its output levels remain greater or equal to those of the real DMU. If this optimal virtual DMU uses as much input as its real DMU, the real DMU's efficiency is defined to be 100%. If the optimal virtual DMU uses less input than the real DMU, the scaling coefficient between the input used by the virtual DMU and that by the real DMU is the efficiency of the real DMU. Basically it answers the question: if a real DMU can be operated as efficiently as its optimal virtual counterpart, how much input can it scale back without reducing any of its outputs? If 0% scale-back is possible, the efficiency is 100%; if 10% scale-back is possible, the efficiency is 90%; if 20% scale-back is possible, the efficiency is 80%.

Thus, in addition to obtaining a relative efficiency ranking for the target utility, a by-product of the DEA is the automatic identification of peers, and gaps in the input and output, which can provide useful insight into where any inefficiency is occurring.

In Step 840 result presentations of the DEA analysis are generated, reviewed and interpreted. The result presentation analyses should include: (1) utility level breakdown analysis; (2) a peer utility to peer utility comparison; and (3) an overall utility efficiency ranking analysis. These result presentations may be shown on computer screens or may represent output on a computer printer.

In the overall utility efficiency ranking analysis, the DEA software tool preferably calculates efficiency scores for all DMU's for each utility in the benchmark group and generates a result presentation summary of the DEA efficiency scores. This thus provides a ranking among utilities with respect to particular inputs and outputs. For example, only four companies may have an efficiency score of one while many other companies may have efficiency scores considerably below one. In this case, the four companies with a score of one are called frontier companies and they, preferably, are the peers other companies are evaluated against. The summary is not the end of the analysis, but rather a starting point.

In the utility level breakdown analysis, the DEA software tool preferably compares the inputs and outputs for the target utility to a virtual benchmark and presents the shortfalls and improvement margins in a presentation screen. That is, during the executed DEA process, all companies with an efficiency score of less than one lie in the interior of the production possibility set. For every interior (in contrast with frontier) company, the DEA process constructs a virtual benchmark company from the peer companies (those with score equal to one) and compares this interior benchmark company input and output with those of the virtual benchmark company. The values associated with the interior company are called original values and those associated with the virtual benchmark are called target values. The difference between the original values and the target values are presented preferably as either excess input or output shortfalls. For example "Excess Used" on the screen might designate the amount of input used by a corresponding utility in excess of the amount of input required by the virtual Benchmark Company. "Shortfall" on the screen might designate the amount of output produced by the corresponding utility less than the amount of output capability of the virtual benchmark company. "Improvement Margin" on the screen might designate the Percentage Value of Excess Used divided by amount of input used by the utility. "Improvement Margin for Output" on the screen might designate the Percentage Value of Shortfall Value divided by the utility's output. In other words, the output level of the utility is broken down into a target level and an amount of shortfall. The ratio between the shortfall and the actual output level generated is the improvement margin.

In the peer utility to peer utility comparison, a set of peer utilities are selected for the target utility and the DEA software tool preferably normalizes the input and output of the peers by the corresponding actual input or output values of the target and presents the results for easy visual comparison. The user/analyst can then review the results. In these comparisons, it is the relative magnitudes of the input and output values, rather than the absolute values of the peer, that are of importance.

For example, one of the peers of company A may be B with respect to certain inputs and outputs. The presentation might show that relative to A, the number of customers served may be B's relative strength. By contrast, another input, system energy loss, may be a weakness of B.

In Step 850, a Model Sensitivity analysis may be performed. Model Sensitivity Analysis allows an analyst to perform 'What-If' analysis on the DEA model. The sensitivity analysis may be performed with respect to the inclusion or the exclusion of one input or one output variable in the base DEA model previously selected. Comparison of the efficiency valuation between the base DEA model and the structurally perturbed DEA model can show the impact on efficiency due to the inclusion or exclusion of a variable in the DEA model. For example, an analyst can determine the affect on network losses of an increase in the number of customers served by increasing the number of customers served variable and running the sensitivity analysis.

iv. Utility Business Profiling

The method of the present invention preferably uses composite ranking analysis, cross checking analysis and multi-attribute utility business profiling in the business profiling step. These processes are preferably automated using a software tool and computing environment as discussed above.

Composite ranking analysis is a methodology that can provide a composite score of a utility business taking into consideration the contributions from all evaluated performance ratios or performance indicators. The following shows how, given a selected set of ratios, a software tool may process the ratios and generate a composite score for a target utility.

If N ratios (between zero and one) are selected to calculate the composite score and the percentile value $Pi(j)$ corresponds to the ith ratio for the jth utility, then a software tool determines an individual ranking score $Si(j)$ for the ith ratio and jth utility as follows: (1) $Si(j)=Pi(j)$ if the performance is considered better with a higher $Pi(j)$; and (2) $Si(j)=1-Pi(j)$ if the performance is considered better with a lower $Pi(j)$.

Once the individual ranking score for each ratio for each utility is determined, the software tool can determine an overall composite score for each utility as: $S(j)=\text{Sum } w(i) Si(j)$, where $w(i)$ is the weighting of the ith ratio. Note that the sum of all $w(i)$ must equal one. Thus, if the target utility is the kth utility, the composite score for the target utility $S(k)$ can be determined: as Sum $w(i) Si(k)$.

The Cross Checking Analysis function is designed to verify the consistency of the information provided from ratio analysis, regression analysis and DEA analysis. The main purpose of applying these three methods for performance assessment is to obtain a multi-perspective view of the utility business, comparing with the benchmark group statistics (ratio analysis) or identifying the performance gap relative to the average performance level (regression analysis) or the best performer (DEA analysis) of BM utilities. On the other hand, for a similar analysis scope, the conclusions obtained from any combination of these three methods should preferably be consistent to some extent or should preferably support each other. For example, for a DEA analysis with two-input and two-output variables, we may define four corresponding performance ratios by dividing each output by one input. Similarly, we may define two corresponding regression models by determining an appropriate regression model for each output with respect to the two inputs. The analyst can then do cross checking analysis as between the conclusions from DEA analysis and ratio analysis or as between DEA analysis and regression analysis.

Multi-Attribute Utility Profiling is designed to determine the current position of a utility business relative to the benchmark group measured in multi-attribute space, such as cost/resource level performance vs. service/productivity level performance, and more importantly to determine the achievable performance improvement in the near future. This analysis will also allocate the performance improvement efforts among various utility business areas.

Preferably, the profiling analysis is performed based on a graphical comparison approach for the strengths and weaknesses of target utilities against benchmark utilities with respect to selected performance ratios or performance indicators. Such graphical comparison is intuitive and straightforward in a two-dimensional space for any pair of selected performance ratios or performance indicators. However, in performing ratio analysis with multiple performance ratios, it is suggested that a relative performance index be used by normalizing the performance ratios to the medians of the benchmark group. Similarly, in performing regression analysis with multiple performance indicators, it is suggested that a relative performance index be used by normalizing the actual performance indicator values to the expected performance indicator values. Alternatively, it is also sensible to group the selected performance ratios or performance indicators into a composite cost/resource level performance index and a composite service/productivity level performance index using the composite ranking approach.

With this graphical comparison capability, the analyst can review a utility's current competitive position with respect to the benchmark statistics to determine if the utility's overall performance satisfies certain acceptable levels. Further, given the cost reduction or productivity improvement potential in various utility business areas, the profiling analysis can help determine how the utility's overall performance can be improved again against the benchmark statistics. Additionally, the profiling analysis can help determine which performance improvement efforts will be most cost-effective toward the utility's overall performance objectives.

CONCLUSION

Thus, an improved utility assessment method has been described. Those with skill in the art will recognize that, while the preceding specification has described particular embodiments of the present invention with reference to the specific details described above, various modifications to these embodiments could be made without departing from the scope of the invention. Thus, the scope of the invention should understood with reference to the following claims and their equivalents.

What is claimed is:

1. A computer based method for assessing the performance of an energy utility, the method comprising:
   a. designating a target utility from amongst a plurality of energy utilities and retrieving performance data for the target utility from a database;
   b. specifying a benchmark criteria defining a subset of the plurality of utilities and causing performance data for the subset to be retrieved, the subset not including the target utility;
   c. causing a comparison between the performance data for the target and the performance data for the subset to be generated; and
   d. assessing the performance of the target in relation to the subset using the generated comparison.

2. The method of claim 1 wherein the benchmark criteria comprise at least a requirement that each member of the subset have data for at least one associated performance indicator within a specified range.

3. The method of claim 1 wherein the performance data for the target includes performance ratio data corresponding to the target and the performance data for the subset includes performance ratio data corresponding to members of the subset.

4. The method of claim 3 wherein the performance ratio data corresponding to the target includes data representing maintenance cost per distribution line mile.

5. The method of claim 1 wherein the step of causing the comparison to be generated comprises causing a regression analysis to be performed on at least one affecting driver and at least one performance indicator for the subset, the determination of an expected value for the at least one performance indicator based on the regression analysis and a comparison between the performance data for the target and the expected value to be generated.

6. The method of claim 1 wherein the step of causing the comparison to be generated comprises causing a Data Envelopment Analysis to be performed on a plurality DEA inputs and a plurality of DEA outputs for the subset, the determination of expected values for each of the plurality of DEA outputs and a comparison between the performance data for the target and the expected values to be generated.

7. The method of claim 6 wherein the step of causing the comparison to be generated further comprises varying at least one of the plurality of DEA inputs, causing a Data Envelopment Analysis to be performed using the at least one varied DEA input, causing the determination of expected values for each of a varied set of DEA outputs, and comparing the expected values for the varied set of DEA outputs to the expected values for the plurality of DEA outputs.

8. The method of claim 1 wherein the step of assessing the performance of the target comprises causing a composite score for the target to be generated from the performance data for the target.

9. A computer based method for assessing the performance of an energy utility, the method comprising:
   a. building a database, the database having performance data for a plurality of energy utilities;
   b. designating a target utility from amongst the plurality of energy utilities and causing performance data for the target to be retrieved from the database;
   c. specifying a benchmark criteria defining a subset of the plurality of utilities and causing performance data for the subset to be retrieved from the database, the subset not including the target utility;
   d. causing a comparison between the performance data for the target and the performance data for the subset to be generated; and
   e. assessing the performance of the target in relation to the subset using the generated comparison.

10. The method of claim 9 wherein the benchmark criteria comprise at least a requirement that each member of the subset have data for at least one associated performance indicator within a specified range.

11. The method of claim 9 wherein the performance data for the target includes performance ratio data corresponding to the target and the performance data for the subset includes performance ratio data corresponding to members of the subset.

12. The method of claim 11 wherein the performance ratio data corresponding to the target includes a data representing distributed maintenance cost per electrical line mile.

13. The method of claim 9 wherein the step of causing the comparison to be generated comprises causing a regression analysis to be performed on at least one affecting driver and at least one performance indicator for the subset, said regression analysis determining an expected value for the at least one performance indicator and causing a comparison of the performance data for the target and the expected value to be generated.

14. The method of claim 9 wherein the step of causing the comparison to be generated comprises causing a Data Envelopment Analysis to be performed on a plurality DEA inputs and a plurality of DEA outputs for the subset, said Data Envelopment Analysis determining expected values for each of the plurality of DEA outputs and causing a comparison between the performance data for the target and the expected values to be generated.

15. The method of claim 9 wherein the step of generating the comparison further comprises varying at least one of the plurality of DEA inputs, performing a Data Envelopment Analysis using the at least one varied DEA input, determining expected values for each of a varied set of DEA outputs, and comparing the expected values for the varied set of DEA outputs to expected values for the plurality of DEA outputs.

16. The method of claim 9 wherein the step of assessing the performance of the target comprises causing a composite score for the target to be generated from the performance data for the target.

17. The method of claim 9 wherein the step of assessing the performance of the target comprises generating a cross checking analysis for a consistence of information obtained from alternate assessment methods.

18. The method of claim 9 wherein the step of assessing the performance of the target comprises generating a multi-attribute utility profiling to facilitate the review and analysis of an overall performance and potential improvement of the target utility.

* * * * *